US011838891B2

United States Patent
Vikberg et al.

(10) Patent No.: US 11,838,891 B2
(45) Date of Patent: Dec. 5, 2023

(54) PAGING OF IDLE STATE WIRELESS COMMUNICATION DEVICES

(71) Applicant: Telefonaktiebolaget LM Ericsson (publ), Stockholm (SE)

(72) Inventors: Jari Vikberg, Järna (SE); Göran Hall, Mölndal (SE); Ulf Mattsson, Kungsbacka (SE); Gunnar Mildh, Sollentuna (SE); Göran Rune, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 328 days.

(21) Appl. No.: 17/286,319

(22) PCT Filed: Oct. 22, 2018

(86) PCT No.: PCT/SE2018/051074
§ 371 (c)(1),
(2) Date: Apr. 16, 2021

(87) PCT Pub. No.: WO2020/085959
PCT Pub. Date: Apr. 30, 2020

(65) Prior Publication Data
US 2021/0385791 A1 Dec. 9, 2021

(51) Int. Cl.
*H04W 68/02* (2009.01)
(52) U.S. Cl.
CPC ................... *H04W 68/02* (2013.01)
(58) Field of Classification Search
CPC .............................. H04W 68/02; H04W 68/00
(Continued)

(56) References Cited

U.S. PATENT DOCUMENTS 10,750,407 B2 *   8/2020   Yan .................. H04W 28/0268
2018/0103495 A1 *   4/2018   Kim ...................... H04W 76/12
(Continued)

FOREIGN PATENT DOCUMENTS

CN       108574969  A       9/2018
CN       1108605281 A       9/2018

OTHER PUBLICATIONS

International Search Report and Written Opinion dated Jul. 24, 2019 for International Application No. PCT/SE2018/051074 filed Oct. 22, 2018, consisting of 11-pages.
(Continued)

*Primary Examiner* — Don N Vo
(74) *Attorney, Agent, or Firm* — Christopher & Weisberg, P.A.

(57) ABSTRACT

Methods and devices of enabling paging of a wireless communication device. In an aspect, a method of a node configured to provide core network user plane functionality in a communications network is provided to enable paging of a wireless communication device being in an idle state. The method includes receiving an indication that data is to be transmitted in downlink to the wireless communication device, identifying a radio access network control plane function, and sending a downlink data notification comprising an identifier of the wireless communication device and of a core network control plane function configured to provide mobility management where the wireless communication device currently is registered, thereby enabling for the identified radio access network control plane function to forward the download data notification to the identified core network control plane function configured to provide mobility management to enable the identified core network control plane function configured to provide mobility management to page the wireless communication device.

20 Claims, 4 Drawing Sheets (58) Field of Classification Search
USPC .................................................. 455/458
See application file for complete search history.

(56) References Cited

U.S. PATENT DOCUMENTS

2018/0227872 A1 8/2018 Li et al.
2021/0282202 A1* 9/2021 Vikberg ................ H04W 76/22

OTHER PUBLICATIONS

3GPP TS 23.502 V15.0.0; 3rd Generation Partnership Project; Technical Specification Group Services and System Aspects; Procedures for the 5G System; Stage 2 (Release 15); Dec. 2017, consisting of 258-pages.

SA WG@ Meeting #S2-128BIS Temporary Document S2-188441 was S2-188015; Title: Update Solution 3: Fix up, Impacts and Evaluation; Agenda Item: 6.9; Source: InterDigital Inc. Document for: Approval; Work Item/Release: FS_CIoT_5G/Rel16; Date and Location: Aug. 20-24, 2018, Sophia Antipolis, France, consisting of 6-pages.

3GPP TS 23.501 V15.1.0; 3rd Generation Partnership Project; Technical Specification Group Services and System Aspects; System Architecture for the 5G System; Stage 2 (Release 15); Mar. 2018, consisting of 201-pages.

3GPP TS 23.502 V15.1.0; 3rd Generation Partnership Project; Technical Specification Group Services and System Aspects; Procedures for the 5G System; Stage 2 (Release 15); Mar. 2018, consisting of 285-pages.

3GPP TS 38.331 V15.1.0; 3rd Generation Partnership Project; Technical Specification Group Radio Access Network; NR; Radio Resource Control (RRC) protocol specification (Release 15); Mar. 2018, consisting of 268-pages.

3GPP TS 38.401 V15.1.0; 3rd Generation Partnership Project; Technical Specification Group Radio Access Network; NG-RAN; Architecture description (Release 15); Mar. 2018, consisting of 23-pages.

3GPP TS 38.806 V15.0.0; 3rd Generation Partnership Project; Technical Specification Group Radio Access Network; Study of separation of NR Control Plane (CP) and User Plane (UP) for split option 2; (Release 15); Dec. 2017, consisting of 22-pages.

Chinese Office Action and English Summary dated Sep. 26, 2023 for Application No. 201880098909.1, consisting of 7 pages.

3GPP TSG-CT WG1 Meeting #105 C1-172963; Title: Paging via 3GPP access for a non-3GPP PDU session; Source: Nokia, Alcatel-Lucent Shanghai Bell; Spec: 3GPP TR 24.890 V0.2.1; Agenda item: 15.2.1.3; Document for: Agreement; Location and Date: Krakow (Poland), Aug. 21-25, 2017, consisting of 8 pages.

* cited by examiner

PAGING OF IDLE STATE WIRELESS COMMUNICATION DEVICES

CROSS-REFERENCE TO RELATED APPLICATIONS

This application is a Submission Under 35 U.S.C. § 371 for U.S. National Stage Patent Application of International Application Number: PCT/SE2018/051074, filed Oct. 22, 2018 entitled "PAGING OF IDLE STATE WIRELESS COMMUNICATION DEVICES," the entirety of which is incorporated herein by reference.

TECHNICAL FIELD

The invention relates to methods and devices of enabling paging of a wireless communication device.

BACKGROUND

Now, 3rd Generation Partnership Project (3GPP) is standardizing a fifth generation (5G) Core Network (CN), being referred to as 5GC, and Next Generation Radio Access Network (NG-RAN).

Figure 1:
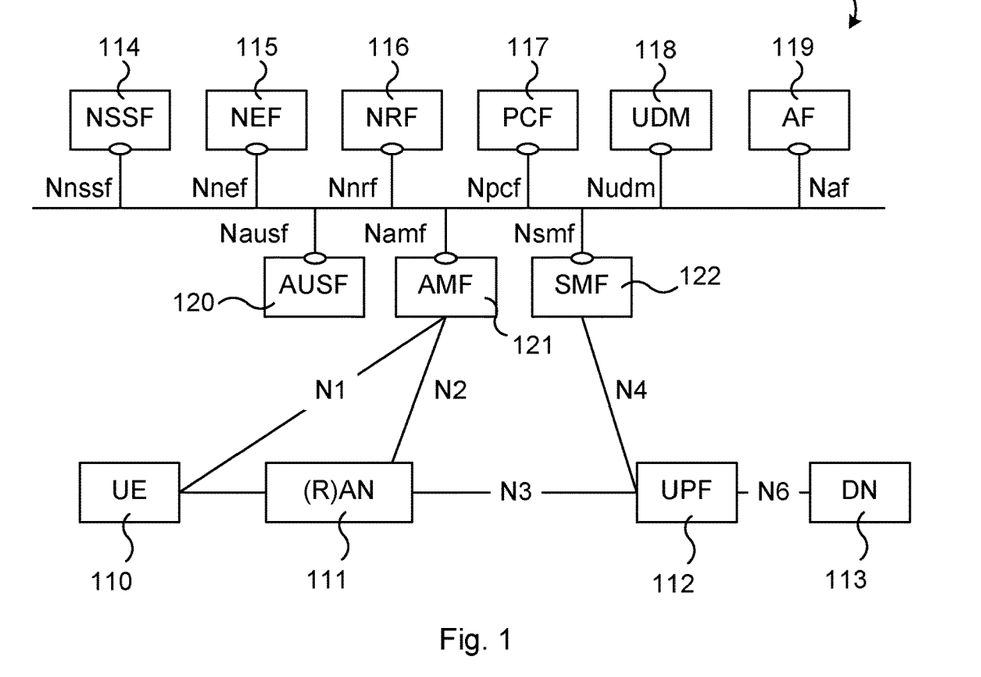
FIG. 1 shows a prior art 5G wireless communication network.

FIG. 1 shows a 5G wireless communication network 100 as depicted in 3GPP TS 23.501 comprising a User Equipment (UE, 110) in the form of for instance a mobile phone, tablet, smart phone, Internet-of-Things (IoT) sensor, etc., connecting to a (Radio) Access Network ((R)AN, 111), and to a Data Network (DN, 113) via a User Plane Function (UPF, 112). The UPF is a service function that processes user plane packets; processing may include altering the packet's payload and/or header, interconnection to data network(s), packet routing and forwarding, etc.

Further, the network is shown to comprise a Network Slice Selection Function (NSSF, 114) for handling network slicing, a Network Exposure Function (NEF, 115) for exposing capabilities and events, an NF (Network Function) Repository Function (NRF, 116) for providing discovery and registration functionality for NFs, a Policy Control Function (PCF, 117), Unified Data Management (UDM, 118) for storing subscriber data and profiles, and an Application Function (AF, 119) for supporting specific applications and optionally application influence on traffic routing.

Moreover, the network is shown to comprise an Authentication Server Function (AUSF, 120) for storing data for authentication of UE, a core network control plane function configured to provide mobility management in the form of an Access and Mobility Function (AMF, 121) for providing UE-based authentication, authorization, mobility management, etc., and a core network control plane function configured to provide session management in the form of a Session Management Function (SMF, 122) configured to perform session management, e.g. session establishment, modify and release, etc.

Figure 2:
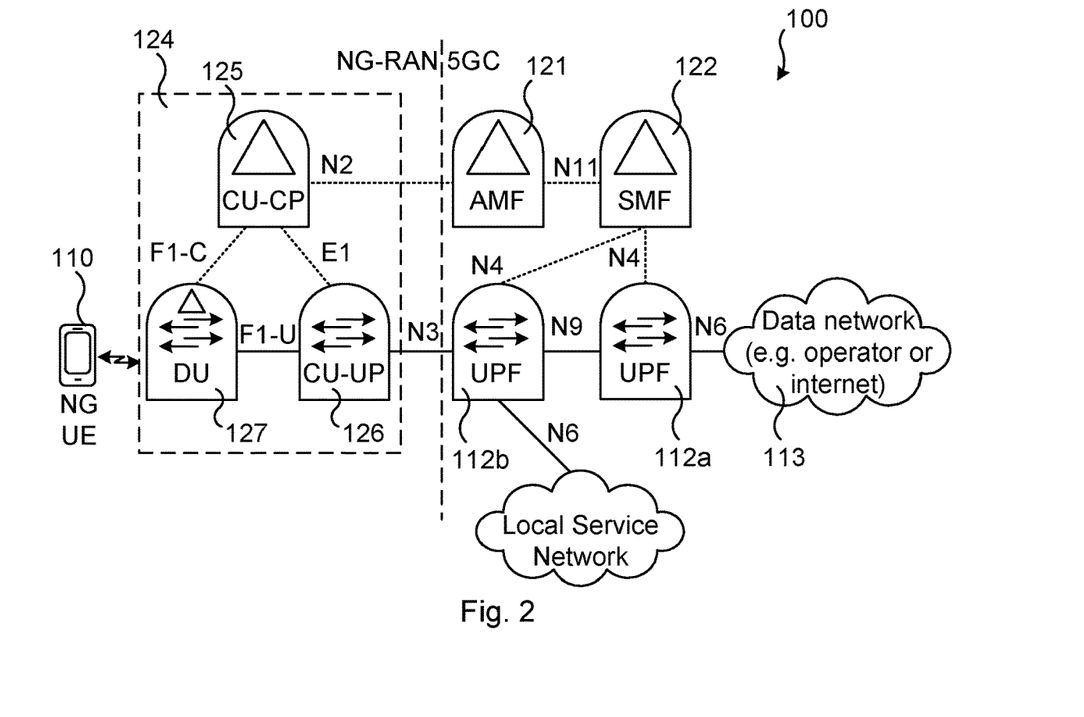
FIG. 2 illustrates a prior art 5G wireless communication network in a different view.

FIG. 2 illustrates a prior art 5G wireless communication network 100 in a different view illustrating a radio base station 124, a so called Next Generation NodeB (gNB), supporting New Radio (NR) radio access technology and forming part of the NG-RAN. The gNB 124 comprises a radio access network control plane function in the form of a Central Unit Control Plane (CU-CP, 125), a radio access network user plane function in the form of a Central Unit User Plane (CU-UP, 126) and a Distributed Unit (DU, 127) for connecting the NG UE 110 to the control plane and the user plane, respectively, which is referred to as a Higher Layer Split (HLS). The gNB provides NR control and user plane terminations towards the UE, and is connected via NG-C/N2 and NG-U/N3 interfaces to the 5GC. Further, the NG-RAN may comprise evolved Long Term Evolution (eLTE) base stations, referred to as ng-eNBs.

The CU-CP 125 hosts the Radio Resource Control (RRC) protocol and the control plane part of the Packet Data Convergence Protocol (PDCP) protocol, while the CU-UP 126 hosts the Service Data Adaptation Protocol (SDAP) protocol and the user plane part of the PDCP protocol. The CU-CP 125 is controlling the CU-UP 126 via an E1 interface.

As shown in FIG. 2, the CU-CP 125 is the function that terminates an N2 interface from the AMF 121 in the 5GC, and the CU-UP 126 is the function terminating an N3 interface from the UPF 112b in the 5GC. Logically, the NG UE 110 has one CU-UP 126 configured per Packet Data Unit (PDU) session.

The SMF 122 connects to UPFs 112a, 112b via the N4 interface and to the AMF 121 via the N11 interface. The N11 interface can alternatively be realized using service-based interfaces utilized by the AMF 121 and SMF 122, i.e. Namf and Nsmf, respectively. FIG. 2 illustrates that the network 100 comprises a plurality of UPFs 112a, 112b, but it is also envisaged that the UPF 112b connecting the NG UE 110 to a local service network 123 via local breakout is omitted, in which case the interface N3 extends between the CU-UP 126 and the UPF 112a.

A problem with this structure is that it results in inefficient user plane handling with multiple different user plane related functions, i.e. DU, CU-UP and one or more UPFs being controlled by separate control plane entities over various interfaces.

SUMMARY

An objective of the present invention is to solve or at least mitigate this problem in the art.

This object is attained in a first aspect of the invention by a method of a node configured to provide core network user plane functionality in a communications network to enable paging of a wireless communication device being in an idle state. The method comprises receiving an indication that data is to be transmitted in downlink to the wireless communication device, identifying, in response to the received downlink data indication, a radio access network control plane function, and sending, to the identified radio access network control plane function, a downlink data notification comprising an identifier of the wireless communication device and of a core network control plane function configured to provide mobility management where the wireless communication device currently is registered, thereby enabling for the identified radio access network control plane function to forward the download data notification to the identified core network control plane function configured to provide mobility management to enable the identified core network control plane function configured to provide mobility management to page the wireless communication device.

This object is attained in a second aspect of the invention by a node configured to provide core network user plane functionality in a communications network to enable paging of a wireless communication device being in an idle state. The node comprises a processing unit and a memory, said memory containing instructions executable by said processing unit, whereby the node is operative to, receive an indication that data is to be transmitted in downlink to the wireless communication device, identify, in response to the received downlink data indication, a radio access network control plane function, send, to the identified radio access network control plane function, a downlink data notification comprising an identifier of the wireless communication device and of a core network control plane function configured to provide mobility management where the wireless communication device currently is registered, thereby enabling for the identified radio access network control plane function to forward the download data notification to the identified core network control plane function configured to provide mobility management to enable the identified core network control plane function configured to provide mobility management to page the wireless communication device.

This object is attained in a third aspect of the invention by a method of a node configured to provide radio access network control plane functionality in a communications network to enable paging of a wireless communication device being in an idle state. The method comprises receiving, from a node configured to provide core network user plane functionality, a downlink data notification comprising an identifier of the wireless communication device and of a core network control plane function configured to provide mobility management where the wireless communication device currently is registered, selecting the core network control plane function configured to provide mobility management identified in the downlink data notification, and sending the downlink data notification to the selected core network control plane function configured to provide mobility management, thereby enabling the core network control plane function configured to provide mobility management to page the identified wireless communication device. This object is attained in a fourth aspect of the invention by a node configured to provide radio access network control plane functionality in a communications network to enable paging of a wireless communication device being in an idle state. The node comprises a processing unit and a memory, said memory containing instructions executable by said processing unit, whereby the node is operative to receive, from a node configured to provide core network user plane functionality, a downlink data notification comprising an identifier of the wireless communication device and of a core network control plane function configured to provide mobility management where the wireless communication device currently is registered, select the core network control plane function configured to provide mobility management identified in the downlink data notification, and send the downlink data notification to the selected core network control plane function configured to provide mobility management, thereby enabling the core network control plane function configured to provide mobility management to page the identified wireless communication device.

Hence, in aspects of the invention, a network node referred to herein as a Combined RAN and CN User Plane Function (CRC-UPF) is introduced in which UPF functionality and CU-UP functionality are integrated, either as a single functional entity or as two separate functional entities with an N3 interface separating the two.

The CRC-UPF hosts the SDAP protocol and the user plane part of the PDCP protocol. The CU-CP is controlling the CU-UP functionality of the CRC-UPF via an E1 interface. Further, the CRC-UPF is arranged with a tunnelled interface—replacing the former N4 interface between a prior art UPF and SMF—passing over the CU-CP and the AMF to the SMF via which the SMF is controlling the UPF functionality of the CRC-UPF. Hence, the tunnelled interface of the CRC-UPF passes over the E1, N2 and N11 interfaces.

This interface passing over E1-N2-N11 is "tunnelled" in the sense that a so called transparent data container is prepared at the SMF and sent over the tunnelled interface via the AMF and the CU-CP which just forward the data container to the CRC-UPF being the final destination (which principle also applies for the opposite direction). Thus, the AMF and the CU-CP do not process the data included in the container, but merely relay the data container to the CRC-UPF.

Initially, the UPF part of the CRC-UPF receives an indication that data is to be transmitted in downlink to the wireless communication device (referred to in the following as a UE) using a specific PDU session, the UE being in an idle state.

In response thereto, the CRC-UPF identifies a need to trigger paging of the UE, whereupon the CRC-UPF identifies the CU-CP (possibly being the CU-CP via which the UE was connected upon entering the idle state). For instance, the CRC-UPF stores a CU-CP identifier when the UE is in a connected or inactive state for subsequently identifying the CU-CP when the UE has entered the idle state and needs to be paged.

The CRC-UPF sends, to the identified CU-CP, a downlink data notification comprising information identifying the AMF where the UE 210 currently is registered and the UE context in that AMF, thereby enabling for the identified CU-CP to subsequently forward the downlink data notification to the identified AMF in order to enable the AMF to page the UE. For instance, this information is embodied by a so called 5G Globally Unique Temporary UE Identity (5G-GUTI).

Advantageously, the disclosure provides support for paging of, and downlink data delivery to, a UE in an idle state when an NG-RAN controlled CRC-UPF is used, being connected to the CU-CP, the AMF and the SMF via the tunnelled N4 interface. The UPF part of the CRC-UPF maintains information needed to forward a downlink data notification to the correct AMF and further to identify the UE context in the AMF. The downlink data notification is forwarded from the CRC-UPF to the CU-CP and further to the AMF.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments are now described, by way of example, with reference to the accompanying drawings, in which.

DETAILED DESCRIPTION

Embodiments will now be described more fully hereinafter with reference to the accompanying drawings. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 shows a prior art 5G wireless communication network having been previously discussed.

FIG. 2 illustrates a prior art 5G wireless communication network in a different view, also having been previously discussed.

Figure 3A:
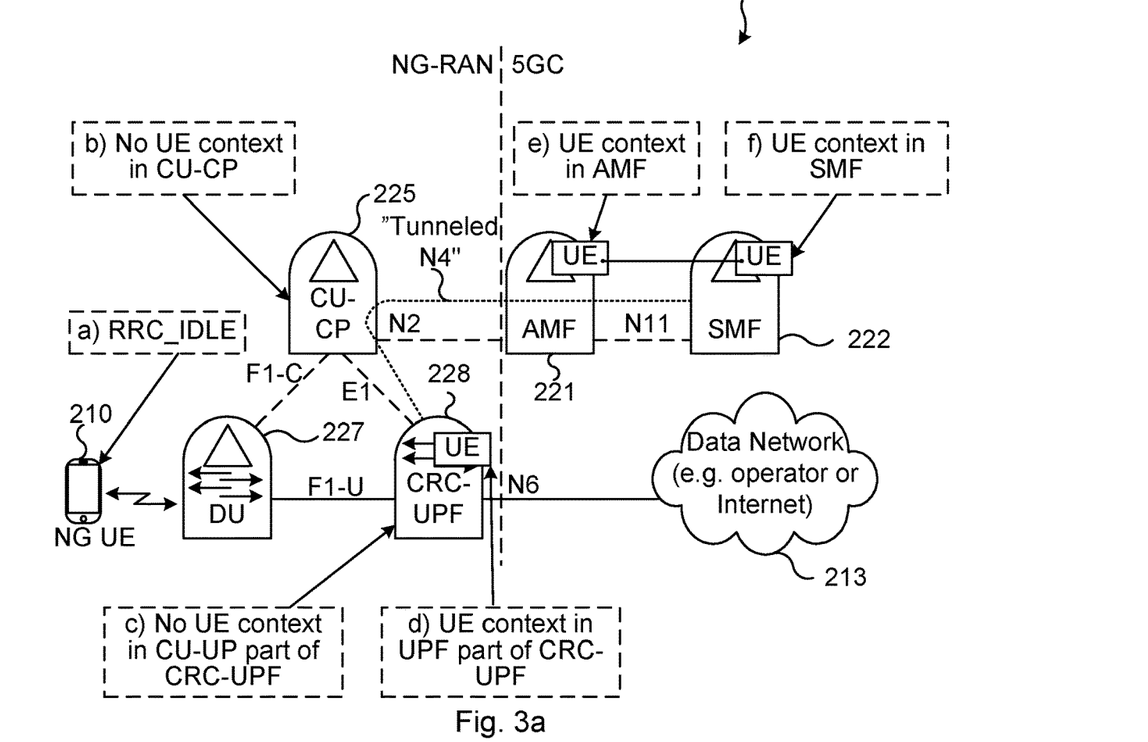
FIGS. 3a and 3b illustrate a 5G communication network implementing a network node configured to connect a wireless communication device to a user plane in the network according to an embodiment.

FIG. 3a illustrates a 5G communication network 200 implementing a network node 228 configured to connect a wireless communication device 210 (i.e. the NG UE) to a user plane in the network 200 according to an embodiment.

In the following, the network node 228 according to the embodiment will be referred to as a Combined RAN and CN User Plane Function (CRC-UPF).

As is shown in FIG. 3a, the NG-RAN comprises a CU-CP 225 hosting the RRC protocol and the control plane part of the PDCP protocol. The CU-CP 225 connects to an AMF 221 via the N2 interface, and to a DU 227 via an F1-C interface, which DU 227 is responsible for connecting the NG UE 210 to the control plane via interface F1-C and to the user plane via interface F1-U.

In this embodiment, the UPF functionality and CU-UP functionality are integrated within the CRC-UPF 228. Hence, the CRC-UPF 228 hosts the SDAP protocol and the user plane part of the PDCP protocol. The CU-CP 225 is controlling the CU-UP functionality of the CRC-UPF via an E1 interface. The CRC-UPF 228 connects to data network 213 via an N6 interface (and possibly also via an N9 interface in case multiple UPFs are used, as discussed hereinabove).

Further, the CRC-UPF 228 is arranged with a tunnelled interface—replacing the former N4 interface illustrated with reference to FIG. 2 between the prior art UPF 112a and the SMF 122—passing over the CU-CP 225 and the AMF 221 to the SMF 222 via which the SMF 222 is controlling the UPF functionality of the CRC-UPF 228. Hence, the tunnelled interface of the CRC-UPF 228 passes over the E1, N2 and N11 interfaces. The N11 interface can alternatively be realized using service-based interfaces utilized by the AMF 221 and SMF 222, i.e. Namf and Nsmf, respectively.

This interface passing over E1-N2-N11 is "tunnelled" in the sense that a so called transparent data container is prepared at the SMF 222 and sent over the tunnelled interface via the AMF 221 and the CU-CP 225 which just forward the data container to the CRC-UPF 228 being the final destination. Thus, the AMF 221 and the CU-CP 225 do not process the data included in the container, but merely relay the data container to the CRC-UPF 228 (which principle also applies in the opposite direction; from the CRC-UPF to the SMF). In other words, the interface is configured to carry transparent data containers comprising configuration data for configuring the core network user plane functionality of the CRC-UPF 228.

Advantageously, with the CRC-UPF 228 user plane latency as well as number of signalling interfaces in the network is reduced. Further, the CRC-UPF 228 advantageously also enables removal of the user plane tunnel between 5GC and NG-RAN as the N3 interface becomes an internal interface in the CRC-UPF 228.

Figure 3B:
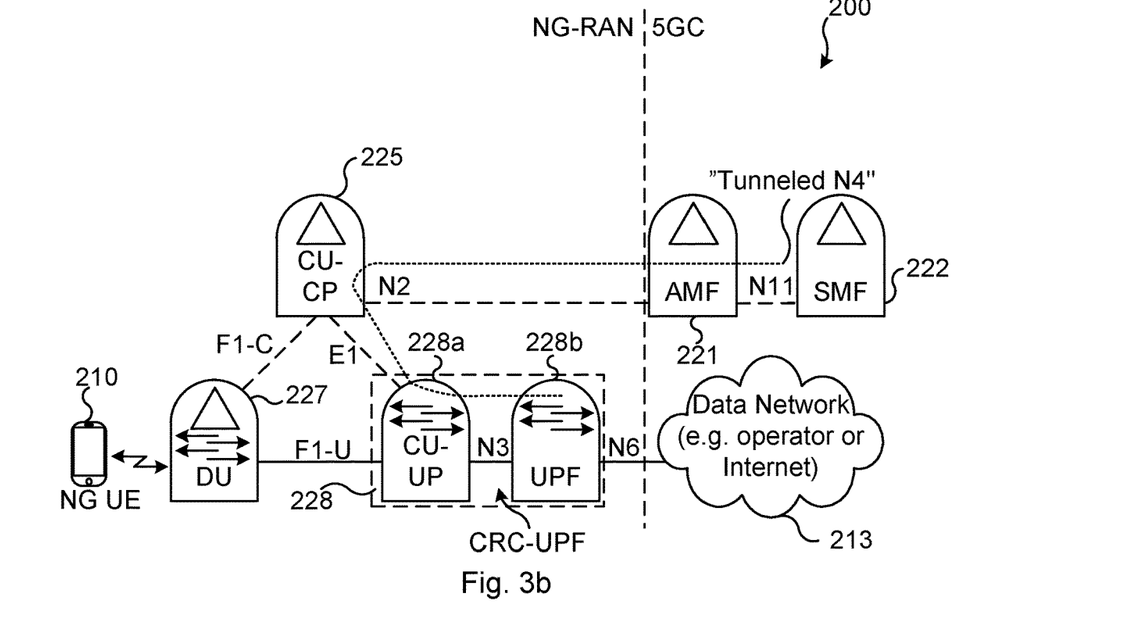

FIG. 3b illustrates an alternative embodiment of the CRC-UPF 228, where the functionality of the CU-UP 228a and the UPF 228b is not combined into one single functional entity as depicted in FIG. 3a, but as two separate functional entities with an N3 interface interconnecting the two thereby forming a CRC-UPF 228. In this case, the UPF 228b could either be arranged in the NG-RAN or in the 5GC, but connects to the SMF 222 via the tunnelled N4 interface. Hence, the tunnelled interface is also extended over the N3 interface and therefore passes over the N3, E1, N2 and N11 interfaces. Alternatively, a new interface is introduced between the CU-CP 225 and the UPF 228b such that data can be sent directly between the CU-CP 225 and the UPF 228b.

Now, the UE 210 may enter three different RRC states: CONNECTED, INACTIVE or IDLE, of which the RRC IDLE state in particular will affect the CRC-UPF 228 communicating over the tunnelled N4 interface. When the UE 210 is in the IDLE state and downlink data is pending for delivery to the UE 210, the UE must be paged such that it can enter the CONNECTED state.

With reference to FIGS. 3a and 3b, in the IDLE state, UE context is only maintained in the network on non-access stratum (NAS) level. This means that the UE is known in the AMF 221 and the SMF 222 which maintain their UE context when the UE enters the IDLE state.

The UE context is a block of information containing the necessary information required to page idle UEs, maintain services towards the active UE, such as UE state information, security information, UE capability information, etc.

The UE context is also maintained in the UPF part of the CRC-UPF 228 (regardless of whether or not the CRC-UPF is implemented as in FIG. 3a or 3b) to have the UE anchor point available in the CRC-UPF 228.

This is needed for example for UE-terminated traffic (i.e. to have the UE anchor point or local breakout point available for the UE 210 terminating traffic).

The problem with the CRC-UPF 228 for UEs in IDLE state is that there is no N4 interface from the CRC-UPF 228 to the SMF 222 or any other interface to the SMF 222 or the AMF 221 to trigger a downlink data notification upon the downlink data arriving at the CRC-UPF 228 over the N6 or N9 interfaces.

Further, there is no UE-specific signalling association maintained over the E1 N2 and N3 interfaces, i.e. the interfaces carrying the transparent data containers enabling the "tunnelled N4" connection between the CRC-UPF 228 and the AMF 221 (and the SMF 222. Therefore, the tunnelled interface does not exist for UEs in IDLE state.

To conclude, again with reference to FIG. 3a (the following description is equally applicable to FIG. 3b), the information maintained in the network for a UE in RRC IDLE state (CM-IDLE state in the 5GC) will be discussed in the following. This assumes that the UE has previously been in RRC CONNECTED state.

a. The UE 210 is in RRC IDLE state.
    b. There is no UE control plane context in the CU-CP 225 in NG-RAN.
    c. There is no UE user plane context in the CU-UP part of the CRC-UPF 228 in NG-RAN.
    d. There are one or more UE context(s) in the UPF part of the CRC-UPF 228 for one or more UE PDU Sessions (i.e. each UE PDU Session has a separate UE context in a corresponding UPF in the same CRC-UPF or in different CRC-UPFs).
    e. There is UE control plane context in the AMF 221 in 5GC. The UE control plane context in the AMF 221 is mainly related to Registration Management (RM) and Connection Management (CM).
    f. There is UE control plane context in at least one SMF 222 in 5GC. The UE control plane context in the SMF 222 is mainly related to Session Management (SM), e.g. UE PDU session(s).

Further, the UE related control plane contexts in the AMF 221 and the SMF 222 are associated. This association can be realized in different ways. The interface between the AMF 221 and the SMF 222 may be realized using service-based interfaces exhibited by AMFs and SMFs, i.e. Namf and Nsmf, respectively. In this case the association is created by the AMF 221 and the SMF 222 providing identifiers of the relevant UE related control plane contexts to each other. These identifiers are then used to create the association. The actual UE related control plane contexts may also be stored outside the AMF 221 and the SMF 222, e.g. in an Unstructured Data Storage Function (UDSF). In this case, the identifiers provided by the AMF 221 and the SMF 222 to each other are actually identifying the UE related control plane context stored in the UDSF.

The N11 interface association may also be based on a UE specific signalling association between the AMF 221 and the SMF 222.

The E1 interface between the CU-CP 225 and the CRC-UPF 228 is established but there is no UE related signalling association in this interface.

The N2 interface between the CU-CP 225 and the AMF 221 is established but there is no UE related signalling association in this interface.

Now, in the prior art network 100 described with reference to FIG. 2, the paging procedure is straightforward; upon a UPF 112a receiving downlink data to be delivered to the UE 110, the UPF 112a will inform the SMF 122 over the N4 interface accordingly, which in its turn will inform that AMF 121 that the UPF 112a has downlink data pending for the UE 110 being in IDLE state. As a result, the AMF 121 will page the UE no via the CU-CP 125, and after successful paging of the UE, the UPF 112a can deliver downlink data to the UE no via the CU-UP 126 and the DU 127.

With a CRC-UPF 228 as shown in FIGS. 3a and 3b, combining a CU-UP with one or more UPFs, this paging procedure is not possible.

Examples of embodiments will be described herein in the context of 5GC and NG-RAN. However, it is also possible to apply the embodiments to other standards, such as previous-generation 3GPP networks, e.g. 4G E-UTRAN/EPC ("Evolved Universal Terrestrial Radio Access Network/Evolved Packet Core").

Figure 4:
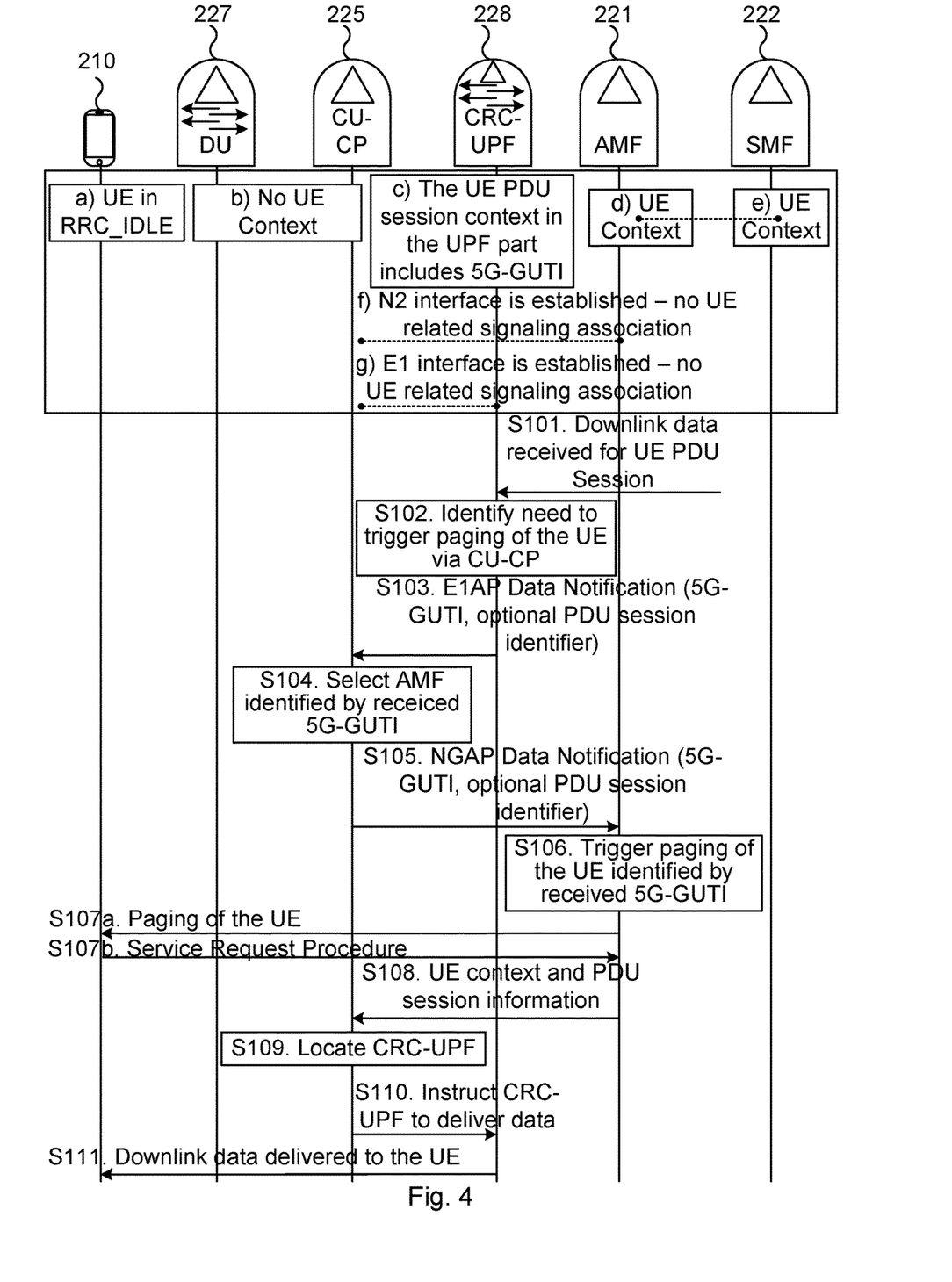
FIG. 4 shows a signalling diagram illustrating paging of a wireless communication device being in an idle state in 5G communication network of FIG. 3a or 3b in an embodiment.

FIG. 4 shows a signalling diagram illustrating a method of enabling paging of a UE 210 being in RRC IDLE state according to an embodiment in a network 200 of the type illustrated in FIG. 3a. Similar signalling would be applied in a network 200 of the type illustrated in FIG. 3b with the exception that communication between the CU-UP part 228a and the UPF part 228b of the CRC-UPF 228 occurs over the N3 interface.

The AMF 221 paging the UE 210 being in RRC IDLE state when downlink data is received at the UPF part of the CRC-UPF 228 is the AMF 221 where the UE 210 currently is registered at, and the UPF part of the CRC-UPF 228 needs to inform the AMF 221 that it has downlink data pending for the UE 210 and thus that the UE 210 must be paged.

Therefore, the UPF part of the CRC-UPF 228 must have access to information identifying the current AMF 221 for the IDLE state UE 210 and further access to information identifying the UE 210 (as represented by the previously discussed UE context in the AMF 221). It is noted that the AMF 221, CRC-UPF 228 and/or SMF 122 may handle multiple PDU sessions (and a corresponding number of UE contexts) for the UE 210 over which downlink data may be transmitted, and each UE context session should in such case be identified.

An example of such an identifier is the 5G-GUTI ("5G Globally Unique Temporary UE Identity") which is a global unique UE identifier identifying the AMF 221 currently serving the UE 210 and the UE context of this particular UE in the AMF 221; it is noted that the AMF 221 typically serves a great number of UEs. In addition, the UPF part of the CRC-UPF 228 needs to maintain information about how to reach the AMF 221 as will be described in the following.

The 5G-GUTI comprises a 5G Temporary Mobile Subscriber Identity (5G-TMSI) identifying the UE 210 and a Globally Unique AMF Identifier (GUAMI) identifying the AMF 221.

There is no direct signalling interface from the UPF part of the CRC-UPF 228 to the AMF 221; any signalling must occur over the E1 and N2 interfaces via the CU-CP 225 in NG-RAN in the context of FIG. 3a, and over the N3, E1 and N2 interfaces via the CU-CP 225 in NG-RAN in the context of FIG. 3b. The CU-CP 225 used needs to be connected to the AMF 221 where the UE 210 is currently registered, i.e. it is not possible to use any CU-CP in NG-RAN.

As previously discussed with reference to FIGS. 3a and 3b, the CRC-UPF 228 consists of both UPF and CU-UP parts. The actual signalling from the UPF part of the CRC-UPF 228 to the CU-CP can be handled in different ways and depends on the internal implementation of the CRC-UPF 228.

In the alternative of FIG. 3b, this signalling occurs via the CU-UP 228a in the CRC-UPF 228 using the N3 interface between the UPF 228b and CU-UP 228a. In this alternative, the CU-UP 228a forwards the information over the E1 interface to the CU-CP 225 identified by the UPF 228b.

In the alternative of FIG. 3a, this signalling occurs directly from the UPF to the CU-CP, i.e. the UPF part of the CRC-UPF 228 can access the E1 interface directly.

With reference to FIG. 4, in the following the signalling will be illustrated in the context of the CRC-UPF 228 illustrated with reference to FIG. 3a, i.e. there is no internal N3 interface in the CRC-UPF 228.

Similar to what has been described with reference to FIG. 3a, the following condition prevails in the network 200.

a. The UE 210 is in RRC IDLE state.
b. There is no UE control plane context in the CU-CP 225 (nor in the DU 227) in NG-RAN.
c. There are one or more UE contexts in the UPF part of the CRC-UPF 228 (for one or more corresponding UE PDU Sessions) containing the identifier of the AMF 221 currently serving the UE 210 and the corresponding UE context at the AMF 221. This identifier will in the following be embodied by the previously discussed 5G-GUTI. There is no UE user plane context in the CU-UP part of the CRC-UPF 228.
d. There is UE control plane context in the AMF 221 in 5GC.
e. There is UE control plane context in at least one SMF 222 in 5GC. The UE related control plane contexts in AMF and SMF are associated.
f. The N2 interface between the CU-CP 225 and the AMF 221 is established but there is no UE related signalling association over the N2 interface.
g. The E1 interface between the CU-CP 225 and the CRC-UPF 228 is established but there is no UE related signalling association over the E1 interface.

In a first step S101, the UPF part of the CRC-UPF 228 receives an indication over the N6 interface (or over N9 interface) that data is to be transmitted in downlink to the UE 210 using a specific PDU session. The received indication may comprise the actual downlink data to be forwarded to the UE and associated with a specific UE address (e.g. IPv4 or IPv6 address) identifying the specific PDU session of the UE.

In response thereto, the CRC-UPF 228 identifies a need to trigger paging of the UE 210. This may be based on internal knowledge in the CRC-UPF 228 that there is no UE user plane context in the CU-UP part of the CRC-UPF 228 for the corresponding UE PDU session, as the UE is in RRC IDLE state, or that there is no downlink path established from the CRC-UPF 228 towards the DU 227 for the corresponding UE PDU session.

In an embodiment, the CRC-UPF 228 identifies in step S102 the CU-CP 225 via which the UE 210 was connected upon entering the RRC IDLE state. For instance, the CU-UP part of the CRC-UPF 228 may be aware of the CU-CP 225, e.g. based on transport layer addresses used for the E1 interface.

In an embodiment, the CRC-UPF 228 stores a CU-CP identifier when the UE 210 is in RRC CONNECTED or RRC INACTIVE state for subsequently identifying the CU-CP 225 when the UE 210 has entered RRC IDLE state and needs to be paged.

In step S103, the CRC-UPF 228 sends, to the identified CU-CP 225, a downlink data notification comprising the 5G-GUTI identifying the AMF 221 where the UE 210 currently is registered and the UE context in that AMF 221, thereby enabling for the identified CU-CP 225 to subsequently forward the downlink data notification to the identified AMF 221 in order to enable the AMF 221 to page the UE 210.

The 5G-GUTI may be provided to the CRC-UPF 228 in different ways, typically either from the AMF 221 or from the SMF 222, before the UE 210 enters the RRC IDLE state, via the N2 and E1 (and N11) interfaces. In one example, the AMF 221 provides the 5G-GUTI to the SMF 222 that further provides the 5G-GUTI to the CRC-UPF 228 using the tunneled interface. In another example, the AMF 221 provides the 5G-GUTI to the CU-CP 225 over the N2 interface and the CU-CP 225 provides the 5G-GUTI to the CRC-UPF 228 over the E1 interface. In both examples, the 5G-GUTI is forwarded to the UPF part of the CRC-UPF 228 within the CRC-UPF 228.

In an embodiment, the CRC-UPF 228 includes in step S103 an identifier configured to identify the UE PDU session over which the downlink data is received.

Upon receiving the 5G-GUTI over the E1 interface, the CU-CP 225 selects in step S104 the AMF 221 identified by the 5G-GUTI (i.e. by means of the GUAMI included in the 5G-GUTI) comprised in the downlink data notification received from the CRC-UPF 228 over the E1 interface.

Thereafter, in step S105, the CU-CP 225 sends the downlink data notification to the selected AMF 221 over the N2 interface, thereby enabling the AMF 221 to page the UE 210 identified by the 5G-GUTI included in the downlink data notification.

In an embodiment, the CU-UP 225 includes in step S105 the identifier received from CRC-UPF in step S103 and configured to identify the UE PDU session over which the downlink data is received.

When the AMF 221 receives the downlink data notification in step S105, it identifies the UE 210 to be paged based on the 5G-GUTI (i.e. by means of the 5G-TMSI included in the 5G-GUTI) in step S106 and accordingly pages the UE 210 in step S107a via the CU-CP 225 over the N2 interface, whereby the UE 210 responses to the paging by performing a conventional Service Request procedure in step S107b. The CU-CP used for the UE-triggered Service Request may be different from that via which the UE 210 was paged in step S107a.

In an alternative embodiment (not shown in FIG. 4), when the AMF 221 receives the downlink data notification in step S105, it forwards the downlink data notification to the SMF 222 that is responsible for handling the PDU session for the UE. The AMF 221 selects the SMF 222 based on the identifier configured to identify the UE PDU session received from the CU-CP 225. The SMF 222 is aware of for example QoS related information, paging policy information and priority information related to the different PDU sessions. Therefore, the SMF 222 may provide additional information to the paging to be performed by the AMF 221. The SMF 222 sends the downlink data notification back to the AMF 221 with more information about how to page the UE, for example related to paging policy or priority. The AMF 222 identifies the UE 210 to be paged based on the 5G-GUTI (i.e. by means of the 5G-TMSI included in the 5G-GUTI) in step S106 and accordingly pages the UE 210 in step S107a via the CU-CP 225 over the N2 interface, whereby the UE 210 responds to the paging by performing a conventional Service Request procedure in step S107b. The CU-CP used for the UE-triggered Service Request may be different from that via which the UE 210 was paged in step S107a.

Once the UE 210 has responded to the paging, the AMF 221 triggers creation of UE context in the CU-CP 225 in step S108. The AMF also provides information about UE PDU Sessions to the CU-CP 225 (in case of multiple PDU sessions being setup).

Further, the CU-CP 225 needs to locate the CRC-UPF(s) 228 that were previously selected for the UE 210, before the UE entered the RRC IDLE state, since the UPF part of the CRC-UPF 228 is maintained also in the RRC IDLE state and the CU-CP 225 needs to select the correct CRC-UPF 228 for each PDU session. In the current case, the mobile-terminated downlink data traffic for the UE 210 is waiting for delivery in one of the CRC-UPF(s) 228.

This can be achieved in different ways, as will be exemplified in the following.

a. When a UE enters RRC IDLE state, the CU-CP sends a message indicating current UE RAN configuration to the AMF. This message would thus comprise information identifying the CRC-UPF(s) used for the UE PDU sessions, for example in the form of a CRC-UPF identifier for each PDU session. Another alternative is to include E1 interface information for each PDU Session. The AMF stores this information and sends it to the CU-CP in step S108. In one embodiment the AMF only provides the CRC-UPF identifier or the E1 interface information only for the UE PDU session over which the downlink data is received.
  b. The CRC-UPF 228 includes a CRC-UPF identifier in the E1AP Data Notification message of step S103. The CU-CP also includes the CRC-UPF identifier in the NGAP Data Notification message of step S105 and the AMF stores this information. Once the UE has responded to the paging, the AMF provides the CRC-UPF identifier to the CU-CP in step S108.

In step S109, the CU-CP 225 thus locates the CRC-UPF(s) 228 based on the information received from the AMF 221 in step S108, and instructs the CU-UP part of the CRC-UPF in step S110 to forward the downlink data which is pending to the UE 210.

Finally, the CRC-UPF 228 sends the data to the UE 210 via the DU 227 in step S111, after which the UE 210 again may enter the RRC IDLE state.

In an embodiment, with reference to step S102 of FIG. 4, the CRC-UPF 228 identifies the CU-CP 225 via which the UE 210 was connected upon entering the RRC IDLE state. Other options may be envisaged, as will be described in the following.

Hence, the CRC-UPF 228 may in an embodiment store a CU-UP identifier designating the CU-CP 225 via which the UE 210 is connected to the control plane of the network 200 before entering the RRC IDLE state.

Advantageously, the disclosure provides support for paging of, and downlink data delivery to, a UE in an RRC IDLE state when a NG-RAN controlled CRC-UPF is used, being connected to the SMF via the "tunnelled N4" interface. The UPF part of the CRC-UPF maintains information needed to forward a downlink data notification to the correct AMF and further to identify the UE context in the AMF. The downlink data notification is forwarded from the CRC-UPF to the CU-CP and further to the AMF.

In an alternative embodiment, the 5G-GUTI is used to identify and locate a CU-CP by the CRC-UPF 228. The principle in this embodiment is that the CRC-UPF 228 performs a CU-CP lookup based on the AMF identifier (i.e. the GUAMI) in the 5G-GUTI and the result is a list of CU-CPs that are able to connect to the AMF 221 identified by the AMF identifier. The UPF part of the CRC-UPF 228 may then select one of the CU-CPs received via the lookup and send the downlink data notification to the selected CU-CP 225. The UPF part of the CRC-UPF 225 may also select more than one CU-CP and forward the notification to these CU-CPs.

FIG. 4 describes the invention for an embodiment in the network 200 of the type illustrated in FIG. 3*a*. FIG. 3*b* illustrates an alternative embodiment of the CRC-UPF 228, where the functionality of the CU-UP 228*a* and the UPF 228*b* is not combined into one single functional entity as depicted in FIG. 3*a*, but as two separate functional entities with an N3 interface interconnecting the two, thereby forming a CRC-UPF 228. The description given in relation to FIG. 4 also applies in a network 200 of the type illustrated in FIG. 3*b* with the additions that the UPF 228*b* also needs to select an CU-UP 228*a* for the downlink data notification (in relation to step S102), and that the CU-CP 225 needs to locate both a CU-UP 228*a* and the UPF 228*b* (in relation to step S109).

Similar to S101, the UPF 228*b* receives an indication over the N6 interface (or over N9 interface) that data is to be transmitted in downlink to the UE 210 using a specific PDU session. The received indication may comprise the actual downlink data to be forwarded to the UE and associated with a specific UE address (e.g. IPv4 or IPv6 address) identifying the specific PDU session of the UE.

In response thereto, the UPF 228*b* identifies a need to trigger paging of the UE 210 (similar to previously described step S102). This may be based on internal knowledge in the UPF 228*b* that there is no N3 interface or N3 tunnel established for the corresponding UE PDU session, as the UE is in RRC IDLE state.

The UPF 228*b* identifies a CU-UP 228*a* and sends a N3 Data Notification to the identified CU-UP 228*a*. The N3 Data Notification comprises the 5G-GUTI identifying the AMF 221 where the UE 210 currently is registered and the UE context in that AMF 221, thereby enabling for a CU-CP 225 to subsequently forward the downlink data notification to the identified AMF 221 in order to enable the AMF 221 to page the UE 210. In an embodiment, the N3 Data Notification includes an identifier configured to identify the UE PDU session over which the downlink data is received.

The 5G-GUTI may be provided to the UPF 228*b* in different ways, typically either from the AMF 221 or from the SMF 222 as described in relation to step S103 with the addition that also the N3 interface is used.

The identification of the CU-UP 228*a* by the UPF 228*b* can be performed in different ways. In one embodiment, there is a one to one mapping between the CU-UP 228*a* and the UPF 228*b*, and the identification is performed based on this one to one mapping. In another embodiment, the UPF 228*b* maintains knowledge about the latest CU-UP 228*a* for specific UE PDU session, and the identification is performed based on this knowledge.

The CU-UP 228*a* receives the N3 Data Notification and identifies a CU-CP 225 and sends an E1AP Data Notification to the identified CU-CP 225. The E1AP Data Notification comprises the 5G-GUTI identifying the AMF 221 where the UE 210 currently is registered and the UE context in that AMF 221, thereby enabling for the identified CU-CP 225 to subsequently forward the downlink data notification to the identified AMF 221 in order to enable the AMF 221 to page the UE 210. In an embodiment, the E1AP Data Notification includes an identifier configured to identify the UE PDU session over which the downlink data is received.

The identification of a CU-CP by the CU-UP 228*a* can be performed in different ways. In one embodiment, the UPF 228*b* maintains information about the latest CU-CP 225 for the UE, for example based on receiving information about the latest CU-CP 225 from the CU-UP 228*a* over the N3-interface. The UPF 228*b* provides information about the latest CU-CP 225 for the UE in the N3 Data Notification message to the CU-UP 228*a* that then identifies the CU-CP 225 based on the provided information. In another embodiment, the UPF 228*b* also identifies a CU-CP 225, for example based on CU-CP lookup based on the AMF identifier as described previously. The UPF 228*b* provides information about the identified CU-CP 225 in the N3 Data Notification message to the CU-UP 228*a* that then identifies the CU-CP 225 based on the provided information.

Description for steps S104, S105, S106, S107 and S108 applies also for the alternative embodiment in FIG. 3b.

Similar to step S109, the CU-CP 225 needs to locate the UPF(s) 228b that were previously selected for the UE 210, before the UE entered the RRC IDLE state, since the UPF 228b is maintained also in the RRC IDLE state and the CU-CP 225 needs to select the UPF 228b for each PDU session. In the current case, the mobile-terminated downlink data traffic for the UE 210 is waiting for delivery in one of the UPF(s) 228b. In addition, the CU-CP 225 needs to locate CU-UP(s) 228a that are able to communicate with the UPF(s) 228b. This can be achieved in different ways as described in relation to step S108 and S109, with the addition that a CRC-UPF identifier consists of both CU-UP identifier and UPF identifier.

Figure 5:
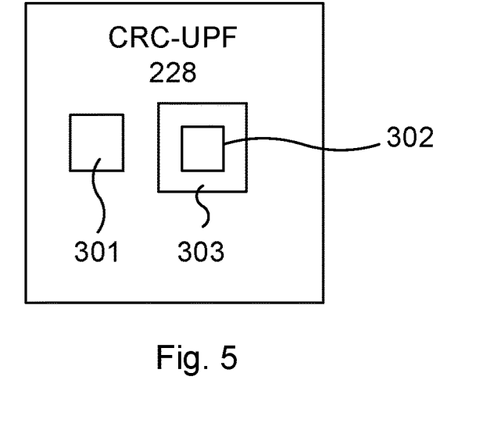
FIG. 5 shows a node configured to provide core network user plane functionality to enable paging of a wireless communication device being in an idle state according to an embodiment.

FIG. 5 illustrates a CRC-UPF 228 according to an embodiment. The steps of the method performed by the CRC-UPF 228 of enabling paging of a wireless communication device being in an idle state according to embodiments are in practice performed by a processing unit 301 embodied in the form of one or more microprocessors arranged to execute a computer program 302 downloaded to a suitable storage volatile medium 303 associated with the microprocessor, such as a Random Access Memory (RAM), or a non-volatile storage medium such as a Flash memory or a hard disk drive. The processing unit 301 is arranged to cause the CRC-UPF 228 to carry out the method according to embodiments when the appropriate computer program 302 comprising computer-executable instructions is downloaded to the storage medium 303 and executed by the processing unit 301. The storage medium 303 may also be a computer program product comprising the computer program 302. Alternatively, the computer program 302 may be transferred to the storage medium 303 by means of a suitable computer program product, such as a Digital Versatile Disc (DVD) or a memory stick. As a further alternative, the computer program 302 may be downloaded to the storage medium 303 over a network. The processing unit 301 may alternatively be embodied in the form of a digital signal processor (DSP), an application specific integrated circuit (ASIC), a field-programmable gate array (FPGA), a complex programmable logic device (CPLD), etc.

Figure 6:
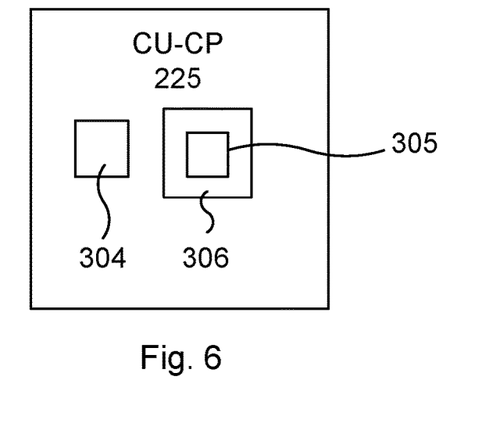
FIG. 6 shows a node configured to provide radio access network control plane functionality to enable paging of a wireless communication device being in an idle state according to another embodiment.

FIG. 6 illustrates a CU-CP 225 according to an embodiment. The steps of the method performed by the CU-CP 225 of enabling paging of a wireless communication device being in an idle state are in practice performed by a processing unit 304 embodied in the form of one or more microprocessors arranged to execute a computer program 305 downloaded to a suitable storage volatile medium 306 associated with the microprocessor, such as a RAM, or a non-volatile storage medium such as a Flash memory or a hard disk drive. The processing unit 304 is arranged to cause the CU-CP 225 to carry out the method according to embodiments when the appropriate computer program 305 comprising computer-executable instructions is downloaded to the storage medium 306 and executed by the processing unit 304. The storage medium 306 may also be a computer program product comprising the computer program 305. Alternatively, the computer program 305 may be transferred to the storage medium 306 by means of a suitable computer program product, such as a DVD or a memory stick. As a further alternative, the computer program 305 may be downloaded to the storage medium 306 over a network. The processing unit 304 may alternatively be embodied in the form of a DSP, an ASIC, an FPGA, a CPLD, etc.

Figure 7:
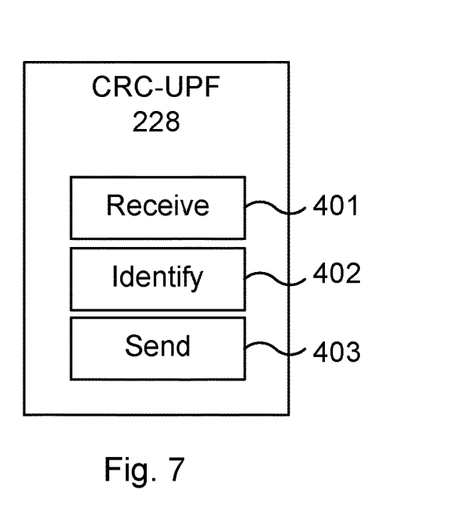
FIG. 7 shows a node configured to provide core network user plane functionality to enable paging of a wireless communication device being in an idle state according to yet another embodiment.

FIG. 7 illustrates a CRC-UPF 228 according to a further embodiment. The CRC-UPF 228 comprises receiving means 401 adapted to receive an indication that data is to be transmitted in downlink to the wireless communication device, identifying means 402 adapted to identify, in response to the received downlink data indication, a radio access network control plane function, and sending means 403 adapted to sending, to the identified radio access network control plane function, a downlink data notification comprising an identifier of the wireless communication device and of a core network control plane function configured to provide mobility management where the wireless communication device currently is registered, thereby enabling for the identified radio access network control plane function to forward the download data notification to the identified core network control plane function configured to provide mobility management to enable the identified core network control plane function configured to provide mobility management to page the wireless communication device.

The means 401-403 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 8:
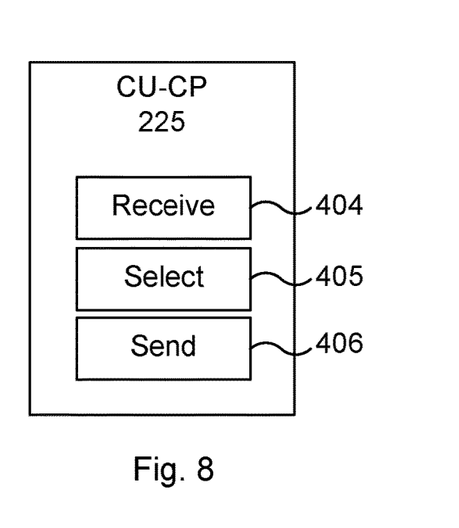
FIG. 8 shows a node configured to provide radio access network control plane functionality to enable paging of a wireless communication device being in an idle state according to a further embodiment.

FIG. 8 illustrates a CU-UP 225 according to a further embodiment. The CU-CP 225 comprises receiving means 404 adapted to receive, from a node configured to provide core network user plane functionality, a downlink data notification comprising an identifier of the wireless communication device and of a core network control plane function configured to provide mobility management where the wireless communication device currently is registered, selecting means 405 adapted to select the core network control plane function configured to provide mobility management identified in the downlink data notification, and sending means 406 adapted to send the downlink data notification to the selected core network control plane function configured to provide mobility management, thereby enabling the core network control plane function configured to provide mobility management to page the identified wireless communication device.

The means 404-406 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a node configured to provide core network user plane functionality in a communications network to enable paging of a wireless communication device being in an idle state, the method comprising:
   receiving an indication that data is to be transmitted in downlink to the wireless communication device;
   identifying, in response to the received downlink data indication, a radio access network control plane function;

sending, to the identified radio access network control plane function, a downlink data notification comprising an identifier of the wireless communication device and of a core network control plane function configured to provide mobility management where the wireless communication device currently is registered, thereby enabling for the identified radio access network control plane function to forward the download data notification to the identified core network control plane function configured to provide mobility management to enable the identified core network control plane function configured to provide mobility management to page the wireless communication device.

2. The method of claim 1, the wireless communication device being identified by the identifier being configured to identify User Equipment, UE, context of the wireless communication device stored at the core network control plane function.

3. The method of claim 1, wherein the sending of the downlink data notification comprising an identifier of the wireless communication device and of a core network control plane function configured to provide mobility management further comprises:
sending an identifier configured to identify a Packet Data Unit, PDU, session via which the downlink data is to be transmitted to the wireless communication device.

4. The method of claim 1, further comprising:
storing the identifier configured to identify the core network control plane function configured to provide mobility management, and the identifier of the wireless communication device.

5. The method of claim 1, the identifier of the wireless communication device and of the core network control plane function configured to provide mobility management where the wireless communication device currently is registered comprising a 5G Globally Unique Temporary User Equipment Identity, 5G-GUTI.

6. The method of claim 1, the identified radio access network control plane function being a radio access network control plane function via which the wireless communication device was connected upon entering the idle state.

7. A method of a node configured to provide radio access network control plane functionality in a communications network to enable paging of a wireless communication device being in an idle state, the method comprising:
receiving, from a node configured to provide core network user plane functionality, a downlink data notification comprising an identifier of the wireless communication device and of a core network control plane function configured to provide mobility management where the wireless communication device currently is registered;
selecting the core network control plane function configured to provide mobility management identified in the downlink data notification; and
sending the downlink data notification to the selected core network control plane function configured to provide mobility management, thereby enabling the core network control plane function configured to provide mobility management to page the identified wireless communication device.

8. The method of claim 7, wherein the receiving of the downlink data notification further comprises:
receiving an identifier configured to identify a Packet Data Unit, PDU, session via which the downlink data is to be transmitted to the wireless communication device; and the sending of the downlink data notification to the selected core network control plane function configured to provide mobility management further comprises:
sending the identifier configured to identify the PDU session via which the downlink data is to be transmitted to the wireless communication device.

9. The method of claim 7, further comprising:
receiving, from the core network control plane function configured to provide mobility management, information identifying the node configured to provide core network user plane functionality via which the downlink data is to be transmitted to the wireless communication device.

10. The method of claim 9, further comprising:
locating the node configured to provide core network user plane functionality; and
instructing the node configured to provide core network user plane functionality to transmit the downlink data to the wireless communication device.

11. A node configured to provide core network user plane functionality in a communications network to enable paging of a wireless communication device being in an idle state, the node comprising:
a processing unit and a memory, the memory containing instructions executable by the processing unit, to cause the node to:
receive an indication that data is to be transmitted in downlink to the wireless communication device;
identify, in response to the received downlink data indication, a radio access network control plane function; and
send, to the identified radio access network control plane function, a downlink data notification comprising an identifier of the wireless communication device and of a core network control plane function configured to provide mobility management where the wireless communication device currently is registered, thereby enabling for the identified radio access network control plane function to forward the download data notification to the identified core network control plane function configured to provide mobility management to enable the identified core network control plane function configured to provide mobility management to page the wireless communication device.

12. The node of claim 11, further caused to identify the wireless communication device by the identifier being configured to identify User Equipment, UE, context of the wireless communication device stored at the core network control plane function.

13. The node of claim 11, further caused to, when sending the downlink data notification comprising an identifier of the wireless communication device and of a core network control plane function configured to provide mobility management:
send an identifier configured to identify a Packet Data Unit, PDU, session via which the downlink data is to be transmitted to the wireless communication device.

14. The node of claim 11, further caused to:
store the identifier configured to identify the core network control plane function configured to provide mobility management, and the identifier of the wireless communication device.

15. The node of claim 11, wherein the identifier of the wireless communication device and of the core network control plane function configured to provide mobility management where the wireless communication device currently is registered comprises a 5G Globally Unique Temporary User Equipment Identity, 5G-GUTI.

16. The node of claim 11, wherein the node has an interface configured to carry transparent data containers comprising configuration data for configuring the core network user plane functionality of the node.

17. The node of claim 11, the identified radio access network control plane function being a radio access network control plane function via which the wireless communication device was connected upon entering the idle state.

18. A node configured to provide radio access network control plane functionality in a communications network to enable paging of a wireless communication device being in an idle state, the node comprising:
 a processing unit and a memory, the memory containing instructions executable by the processing unit to cause the node to:
  receive, from a node configured to provide core network user plane functionality, a downlink data notification comprising an identifier of the wireless communication device and of a core network control plane function configured to provide mobility management where the wireless communication device currently is registered;
  select the core network control plane function configured to provide mobility management identified in the downlink data notification; and
  send the downlink data notification to the selected core network control plane function configured to provide mobility management, thereby enabling the core network control plane function configured to provide mobility management to page the identified wireless communication device.

19. The node of claim 18, further caused to, when receiving the downlink data notification:
 receive an identifier configured to identify a Packet Data Unit, PDU, session via which the downlink data is to be transmitted to the wireless communication device; and the sending of the downlink data notification to the selected core network control plane function configured to provide mobility management further comprises:
  send the identifier configured to identify the PDU session via which the downlink data is to be transmitted to the wireless communication device.

20. The node of claim 18, further caused to:
 receive, from the core network control plane function configured to provide mobility management, information identifying the node configured to provide core network user plane functionality via which the downlink data is to be transmitted to the wireless communication device.

* * * * *